(12) United States Patent
Sato et al.

(10) Patent No.: US 10,797,571 B2
(45) Date of Patent: Oct. 6, 2020

(54) COIL MANUFACTURING DEVICE AND COIL MANUFACTURING METHOD

(71) Applicant: NITTOKU ENGINEERING CO., LTD., Saitama (JP)

(72) Inventors: Takayuki Sato, Fukushima (JP); Takayuki Kurosawa, Fukushima (JP)

(73) Assignee: NITTOKU CO., LTD., Saitama, Saitama (JP)

( * ) Notice: Subject to any disclaimer, the term of this patent is extended or adjusted under 35 U.S.C. 154(b) by 653 days.

(21) Appl. No.: 15/502,433

(22) PCT Filed: Aug. 5, 2015

(86) PCT No.: PCT/JP2015/072270
§ 371 (c)(1),
(2) Date: Feb. 7, 2017

(87) PCT Pub. No.: WO2016/021654
PCT Pub. Date: Feb. 11, 2016

(65) Prior Publication Data
US 2017/0229946 A1 Aug. 10, 2017

(30) Foreign Application Priority Data
Aug. 8, 2014 (JP) .................. 2014-162252

(51) Int. Cl.
*H02K 15/04* (2006.01)
*H02K 15/06* (2006.01)
*H02K 15/00* (2006.01)

(52) U.S. Cl.
CPC ..... *H02K 15/0435* (2013.01); *H02K 15/0037* (2013.01); *H02K 15/045* (2013.01); *H02K 15/067* (2013.01)

(58) Field of Classification Search
CPC .......... H02K 15/0435; H02K 15/0037; H02K 15/045; H02K 15/067
USPC ............... 29/596, 592.1, 734, 732, 729, 700
See application file for complete search history.

(56) References Cited

U.S. PATENT DOCUMENTS

| 6,223,784 B1 | 5/2001 | Kirschner |
| 6,229,241 B1 | 5/2001 | Ishigami et al. |
| 7,185,413 B2 * | 3/2007 | Kuroyanagi ....... H02K 15/0037 140/92.1 |

FOREIGN PATENT DOCUMENTS

| JP | S51-63799 A | 6/1976 |
| JP | H10-271733 A | 10/1998 |
| JP | 2001-513320 A | 8/2001 |

* cited by examiner

*Primary Examiner* — Peter Dungba Vo
*Assistant Examiner* — Azm A Parvez
(74) *Attorney, Agent, or Firm* — Rabin & Berdo, P.C.

(57) ABSTRACT

A coil manufacturing device for manufacturing a coil by rotating a winding core and winding a wire around the rotating winding core, the coil manufacturing device includes a recess formed in the winding core, the recess being configured to suspend the wire wound around the winding core in the recess; and a wire bundling device configured to bundle the wire suspended in the recess.

7 Claims, 15 Drawing Sheets

COIL MANUFACTURING DEVICE AND COIL MANUFACTURING METHOD

TECHNICAL FIELD

The present invention relates to a coil manufacturing device and a coil manufacturing method that are suited for manufacture of a coil used in a stator of a rotary electric machine, such as a three-phase alternating-current electric generator.

BACKGROUND ART

Conventionally, a stator of a rotary electric machine includes a plurality of teeth (magnetic poles) that are aligned in a radial fashion and project radially inward, a tubular stator core having a plurality of slots that each open between the teeth, and stator coils that are installed in the stator core by stowing coil edges into the slots.

As for installation of stator coils, a so-called inserter method is known whereby stator coils are manufactured in advance separately from a stator core, and the coils are installed in slots of the core using an inserter device (for example, see JP 2001-513320A).

Meanwhile, in recent years, markets demand an efficient rotary electric machine to conserve energy. In view of this, attempts have been made to improve the efficiency of a rotary electric machine typically by improving the density, that is to say, the space factor of coils mounted inside slots of a stator core.

In order to improve the space factor, a suggestion has been made to prepare coils that have been aligned and wound into bundles having a cross-section corresponding to a cross-section of slots in advance outside the slots, and then mount the coils by inserting the coils in a radius direction from the opening side having the same width as the slots while maintaining the shapes of the coils (see, for example, JP 10-271733A).

SUMMARY OF INVENTION

However, even if such coils have been obtained outside the slots through alignment and winding into bundles having the cross-section corresponding to the cross-section of the slots, it will unfortunately be difficult to insert coil edges into the slots unless the shapes of the coil edges are maintained until the coil edges are inserted into the slots.

In JP 10-271733A mentioned above, in order to maintain the shapes of the coil edges, as the wires constituting such coils, so-called self-fusing wires, in which a fusing layer is formed as an outermost layer, are used to bond bundles of the wires constituting the coil edges mutually and to maintain the shapes.

However, when the self-fusing wires are used, it is necessary to apply heat to dissolve fusing thereof at the time of wire winding. Here, as a heating method, a current application method utilizing the coil resistance is used, or the coils are passed through the inside of a heating furnace. For this reason, a conventional coil manufacturing device that winds self-fusing wires requires current application equipment and heating equipment for dissolving fusing of the wires, and is hence unfortunately increased in size.

Furthermore, coils that are made of relatively thick wires have high elasticity. When the elasticity force of wires exceeds the bonding force by self-fusing, there is a possibility that a part of the wires at coil edges of the manufactured coils is separated from the other wires, and the shapes of the coil edges are not maintained.

The present invention aims to provide a coil manufacturing device and a coil manufacturing method that can reliably maintain the shapes of obtained coils without increasing the size of the device, even if wires are relatively thick.

According to one aspect of the present invention, a coil manufacturing device for manufacturing a coil by rotating a winding core and winding a wire around the rotating winding core, the coil manufacturing device includes: a recess formed in the winding core, the recess being configured to suspend the wire wound around the winding core; and a wire bundling device configured to bundle the wire suspended in the recess.

According to one aspect of the present invention, a coil manufacturing method for manufacturing a coil by rotating a winding core and winding a wire around the rotating winding core, the coil manufacturing method includes: forming a recess in the winding core, the recess configured to suspend the wire wound around the winding core in the recess; and bundling the wire suspended in the recess after winding the wire around the winding core.

DESCRIPTION OF EMBODIMENTS

An embodiment of the present invention will be described below with reference to the drawings.

Figure 12:
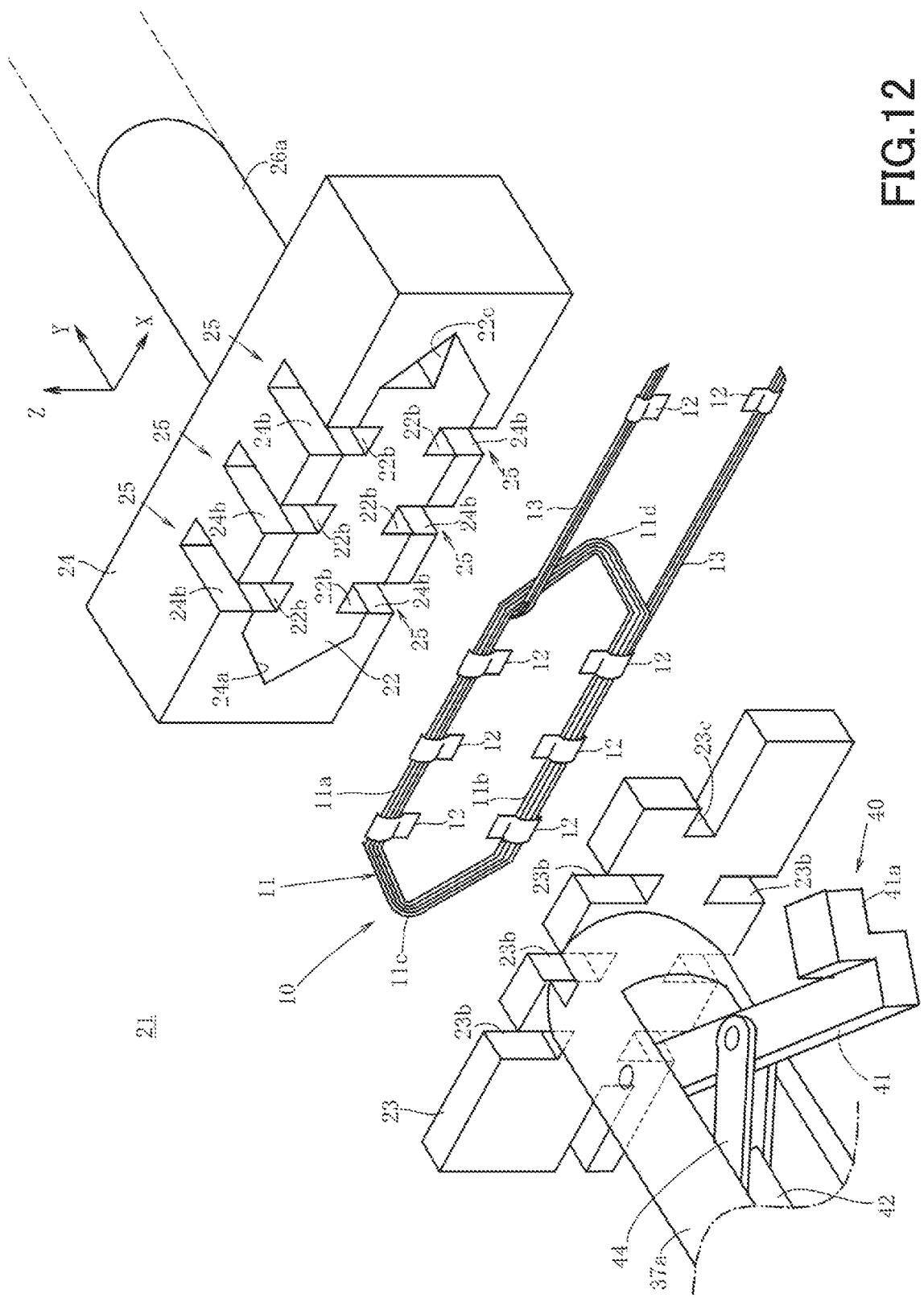
FIG. 12 is a perspective view of extraction of the obtained coils from the winding core.

FIG. 12 shows a coil 10 obtained in the present embodiment. The coil 10 is used in a stator of a rotary electric machine, such as a three-phase alternating-current electric generator. The coil 10 includes a coil body 11 made up of wound wires 13, and adhesive tapes 12 that have a predetermined length and are attached to maintain the shape of the coil body 11. The coil body 11 includes a pair of coil edges 11a, 11b inserted into non-illustrated slots of a stator core, and coil ends 11c, 11d that are not inserted into the slots and project from an end surface of the stator core. The pair of coil edges 11a, 11b is formed to be longer than the length of the slots of the stator core into which the pair of coil edges 11a, 11b is to be mounted. The coil ends 11c, 11d are formed to join the tips of the pair of coil edges 11a, 11b.

In the present embodiment, each of the coil ends 11c, 11d is formed into a shape of a mountain with an intersection of a predetermined angle. The coil body 11 is obtained by winding a plurality of relatively thick wires 13. An adhesive tape 12 of the predetermined length is attached at multiple locations to maintain the shape of the obtained coil body 11.

Figure 1:
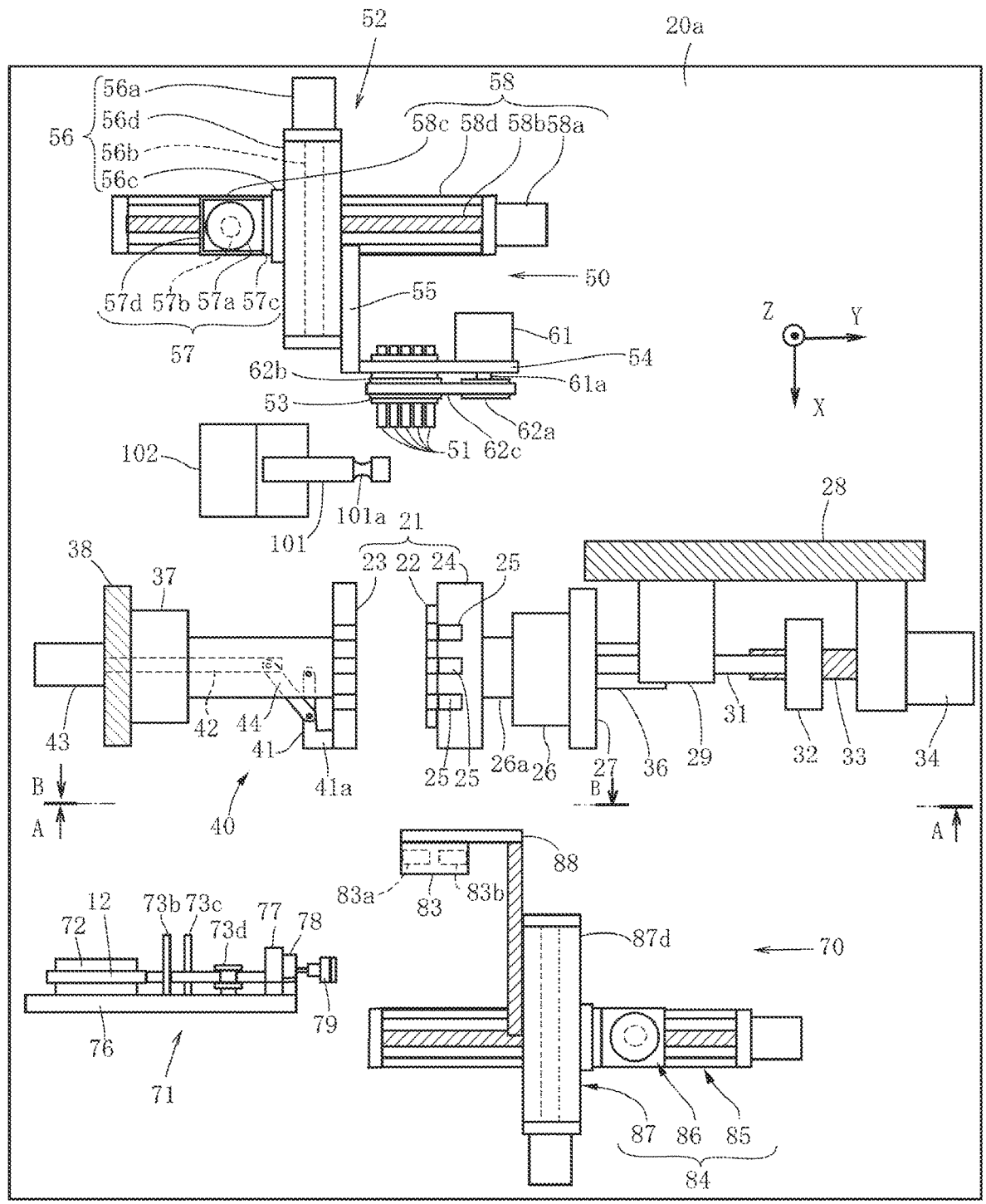
FIG. 1 is a plan view of a coil manufacturing device according to the present embodiment.

FIG. 1 shows a coil manufacturing device 20 according to the present embodiment, which manufactures the coil 10. Three axes X, Y, and Z that are orthogonal to one another are set. It will be assumed that the X-axis, Y-axis, and Z-axis respectively extend in a substantially horizontally front-back direction, a substantially horizontally sideways direction, and a substantially vertical direction. The following describes a configuration of the coil manufacturing device 20.

The coil manufacturing device 20 according to the present embodiment includes a rotatable winding core 21. The coil manufacturing device 20 rotates the winding core 21 and winds the wires 13 around the rotating winding core 21. The winding core 21 includes a winding barrel 22 around which the wires 13 are wound, a fixed-side flange 23 placed at one end of the winding barrel 22, and a movable-side flange 24 placed at the other end of the winding barrel 22.

Figure 3:
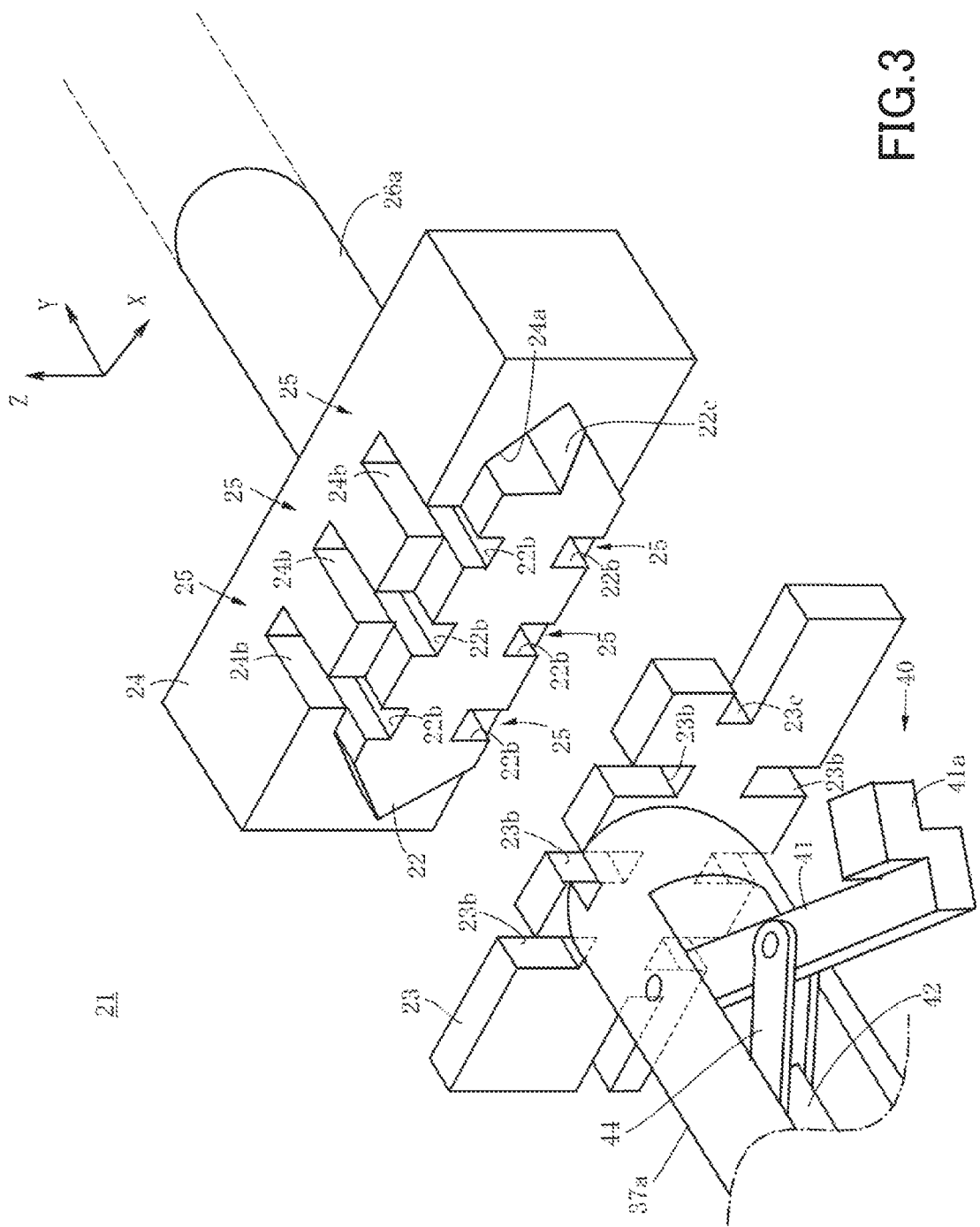
FIG. 3 is a perspective view of a winding core.

As shown in FIGS. 3 and 12, the winding barrel 22 is formed in such a manner that the outer shape thereof is the equivalent of the inner peripheral shape of the coil body 11. As each of the coil ends 11c, 11d of the coil body 11 is formed into a shape of a mountain as shown in FIG. 12, the outer shape of the winding barrel 22, which is the equivalent of the inner peripheral shape of the coil body 11, is hexagonal.

A hole 24a is formed at the center of the movable-side flange 24. The shape of the hole 24a is slightly larger than the outer shape of the winding barrel 22. The winding barrel 22 having the hexagonal outer shape is inserted into the hole 24a, and is able to advance from/retract toward the movable-side flange 24.

Figure 2:
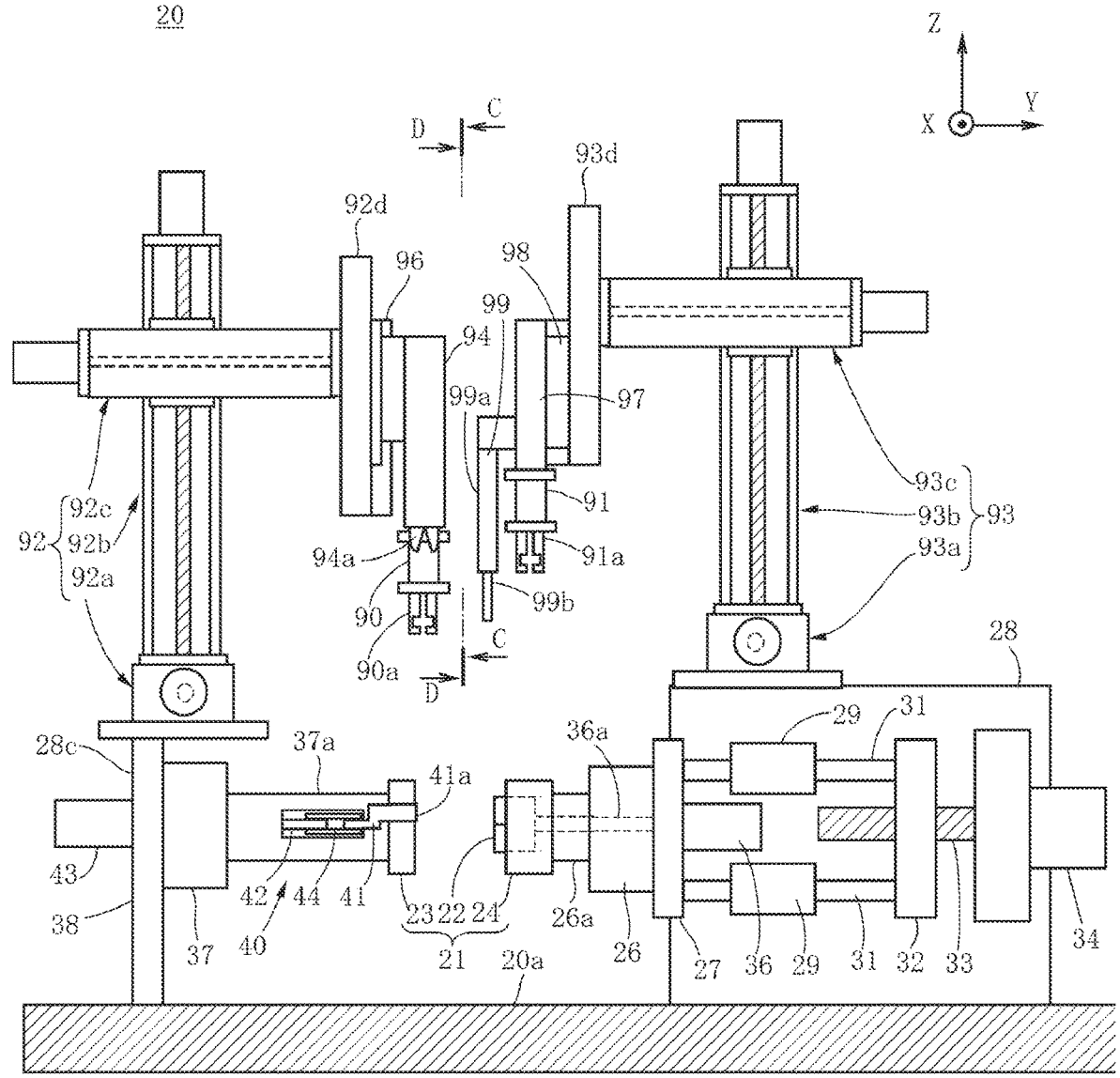
FIG. 2 is a view observed along arrows A of FIG. 1.

As shown in FIGS. 1 and 2, the movable-side flange 24 is attached coaxially to a rotation shaft 26a of a movable-side motor 26. The movable-side motor 26 is attached to a movable plate 27.

A support plate 28 extending in the horizontally sideways direction (Y-axis direction) stands on a level top surface of a device mount 20a. Linear-motion bearings 29 are attached to the support plate 28, at a predetermined interval in an up-down direction (Z-axis direction), in such a manner that their axes extend in the horizontally sideways direction. Rods 31 are inserted through the linear-motion bearings 29 in such a manner that the rods 31 can freely reciprocate in the sideways direction. The movable plate 27 is attached to projection ends of the rods 31.

A female thread plate 32 is attached to the proximal end side of the pair of rods 31. A male screw 33 extending in the horizontally sideways direction is screwed into the female thread plate 32. A movement motor 34 that rotates the male screw 33 is attached to the support plate 28. Rotation of the male screw 33 caused by the movement motor 34 makes the female thread plate 32 move in the horizontally sideways direction. When the female thread plate 32 moves, the movable plate 27 moves via the rods 31, and hence the movable-side motor 26 mounted on the movable plate 27 moves in the horizontally sideways direction (Y-axis direction) together with the movable-side flange 24.

Figure 10A:
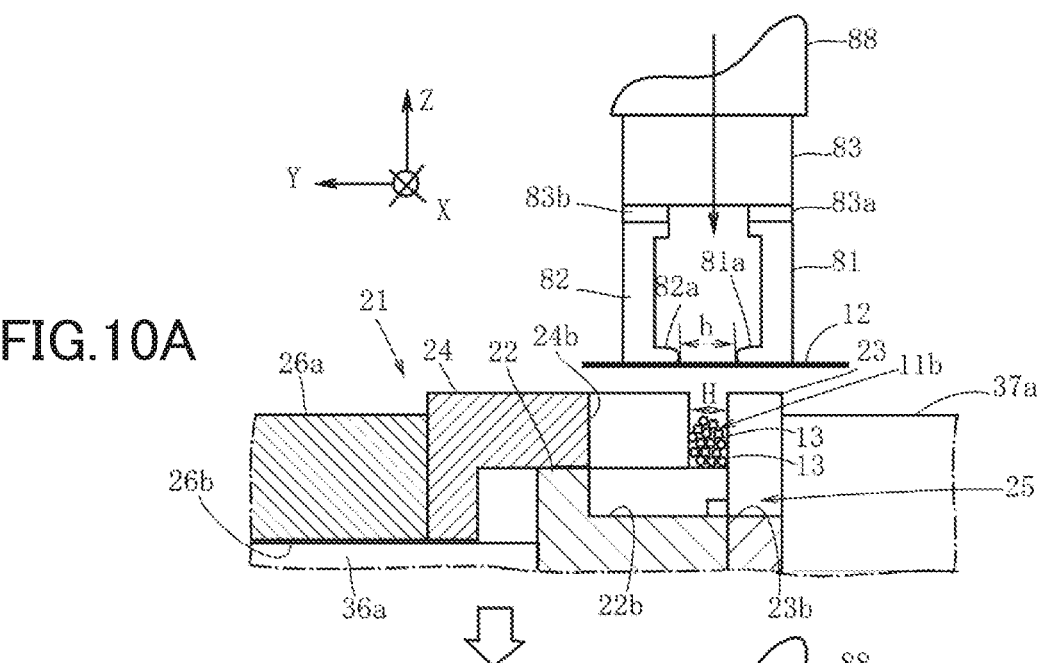
FIGS. 10A to 10C are views observed along arrows E of FIG. 9, and depict attachment of an adhesive tape to the wires suspended in a recess of the winding core.
Figure 10B:
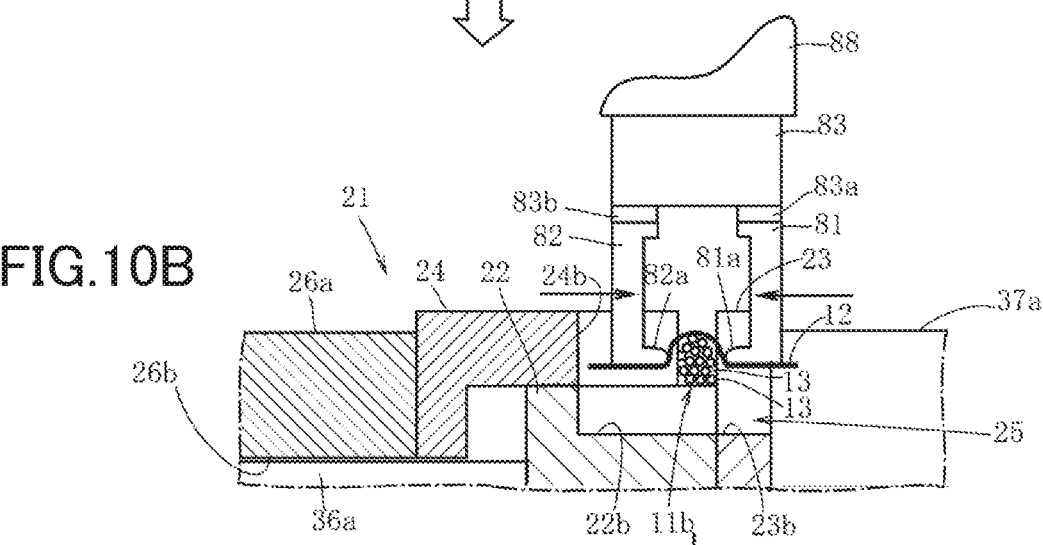
Figure 10C:
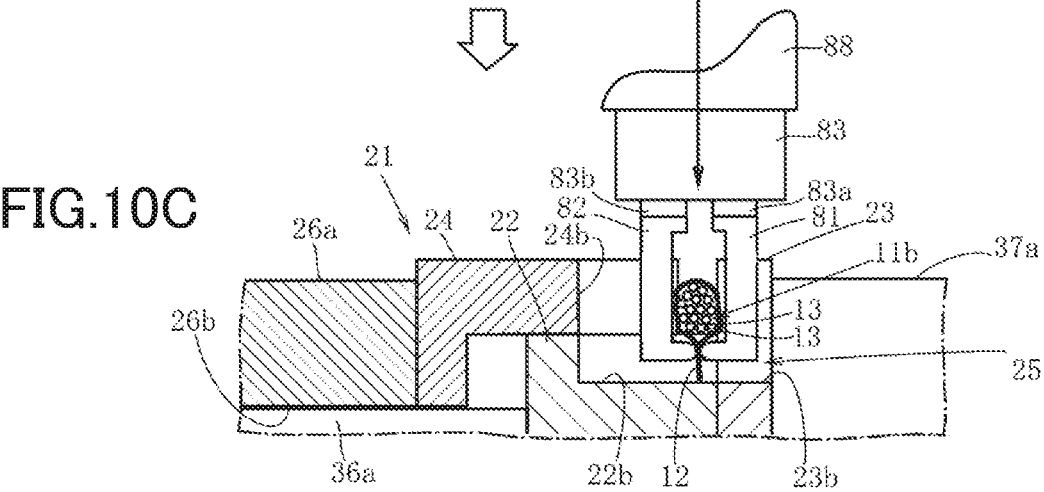

A through hole 26b is formed on the central axis of the rotation shaft 26a in the movable-side motor 26 (FIGS. 10A to 10C). A fluid pressure cylinder 36 is attached to the movable plate 27 to which the movable-side motor 26 is attached (FIG. 2). As shown in FIGS. 2 and 10, an advancing rod 36a of the fluid pressure cylinder 36 penetrates through the through hole 26b, and is attached to the winding barrel 22a at a distal end.

The fluid pressure cylinder 36 causes the winding barrel 22 to project from the movable-side flange 24 as shown in FIG. 3 by causing the advancing rod 36a to project. The fluid pressure cylinder 36 retracts the winding barrel 22 into the movable-side flange 24 as shown in FIG. 12 by retracting the advancing rod 36a.

Returning to FIGS. 1 and 2, a fixed-side motor 37 is attached to the device mount 20a in such a manner that the fixed-side motor 37 is distant from the movable plate 27, to which the movable-side motor 26 is attached, in the horizontally sideways direction, and its rotation shaft 37a and the rotation shaft 26a of the movable-side motor 26 are coaxial. The fixed-side motor 37 is attached to the device mount 20a via an attachment member 38. The fixed-side flange 23 and the rotation shaft 37a of the fixed-side motor 37 are coaxial.

In the above-described winding core 21, one end of the winding barrel 22, that is to say, a projection end of the winding barrel 22 can be brought into contact with the fixed-side flange 23 by moving the movable-side flange 24 while the winding barrel 22 is projecting from the movable-side flange 24. Furthermore, the winding core 21 is rotated by synchronized rotation of the movable-side motor 26 and the fixed-side motor 37.

As shown in FIG. 1, the coil manufacturing device 20 according to the present embodiment includes a wire propelling machine 50 that propels the wires 13 to be wound around the rotating winding core 21. The wire propelling machine 50 includes nozzles 51 through which the wires 13 are inserted, and a nozzle moving mechanism 52 for moving the nozzles 51 in the three axis directions.

Figure 7:
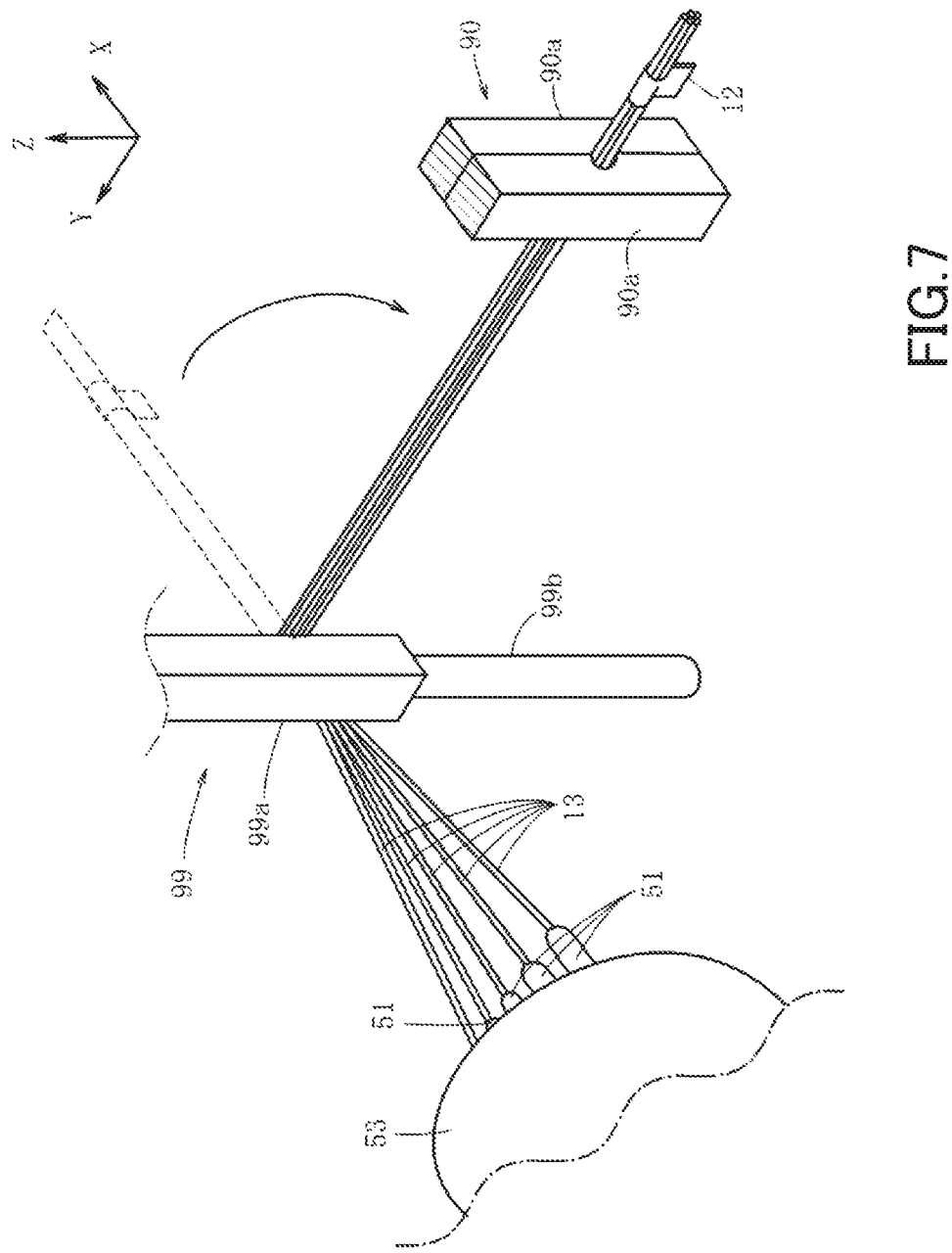
FIG. 7 is a perspective view of bending of winding start portions of wires.

In the present embodiment, the coil is manufactured using five wires 13 (see FIG. 7). The wire propelling machine 50 includes five nozzles 51 through which the wires 13 are inserted. The five nozzles 51 are attached to a columnar nozzle base 53 in a state where they are aligned in a straight line so as to be parallel to one another. The nozzle base 53 is rotatably mounted on a pivot plate 54. The nozzle moving mechanism 52 allows the pivot plate 54 to move in the three axis directions relative to the device mount 20a.

The nozzle moving mechanism 52 is composed of a combination of extendable actuators 56 to 58 for the X-axis, Y-axis, and Z-axis directions. The extendable actuators 56 to 58 include housings 56d to 58d, ball screws 56b to 58b, and followers 56c to 58c. Each of the housings 56d to 58d has a shape of a narrow, elongated box. Each of the ball screws 56b to 58b extends in a longitudinal direction inside a corresponding one of the housings 56d to 58d, and is driven and rotated by a corresponding one of servomotors 56a to 58a. The followers 56c to 58c are translated in a state where they are screwed to the ball screws 56b to 58b, respectively.

In the extendable actuators 56 to 58, when the ball screws 56b to 58b are rotated by driving of the servomotors 56a to 58a, the followers 56c to 58c screwed to the ball screws 56b to 58b move in the longitudinal direction of the housings 56d to 58d.

In the present embodiment, a pivot plate 55 provided with the nozzles 51 is attached to the housing 56d of the extendable actuator 56 for the X-axis direction in a manner movable in the X-axis direction, and the follower 56c of the extendable actuator 56 for the X-axis direction is attached to the follower 57c of the extendable actuator 57 for the Z-axis direction so as to allow the pivot plate 55 to move in the Z-axis direction together with the extendable actuator 56 for the X-axis direction.

Also, the housing 57d of the extendable actuator 57 for the Z-axis direction is attached to the follower 58c of the extendable actuator 58 for the Y-axis direction so as to allow the pivot plate 55 to move in the Y-axis direction together with the extendable actuators 56, 57 for the X-axis and Z-axis directions.

The housing 58d of the extendable actuator 58 for the Y-axis direction extends in the Y-axis direction, and is fixed to the device mount 20a. The servomotors 56a to 58a of the extendable actuators 56 to 58 are connected to control output of a non-illustrated controller that controls the servomotors 56a to 58a.

A servomotor 61 that rotates the nozzle base 53 is attached to the pivot plate 54. The nozzle base 53 and a rotation shaft 61a of the servomotor 61 are provided with pulleys 62a, 62b. A belt 62c is hung across the pulleys 62a, 62b. When the rotation shaft 61a is rotated by driving of the servomotor 61, this rotation is transmitted to the nozzle base 53 via the belt 62c. Consequently, the nozzle base 53 is rotated together with the five nozzles 51.

As specifically shown in FIG. 3, recesses 25 are formed in the winding core 21. Parts of the wound wires 13 are suspended in the recesses 25. Suspension of the wires 13 means that parts of the wires 13 are not in contact with other components.

The winding core 21 includes the winding barrel 22, the fixed-side flange 23, and the movable-side flange 24. The recesses 25, in which the wires 13 are suspended, are each made up of cutouts 22b, 23b, and 24b that are respectively formed in parts of the outer peripheries of the winding barrel 22, the fixed-side flange 23, and the movable-side flange 24. The cutouts 22b, 23b, 24b are continuous in the axial direction, thereby constituting a single, continuous recess 25. In the present embodiment, the recesses 25 are formed in such a manner that each of the coil edges 11a, 11b is suspended at three locations. That is to say, a total of six recesses 25 are formed in the winding core 21.

A locking groove 23c for locking winding start portions of the wires 13 is formed in the fixed-side flange 23 (see FIG. 3). A guiding cutout 22c is formed in the winding barrel 22 at a position corresponding to the locking groove 23c. The guiding cutout 22c guides the wires 13 locked in the locking groove 23c to the periphery of the winding barrel 22.

As shown in FIG. 3, the rotation shaft 37a of the fixed-side motor 37 is provided with a pressing mechanism 40 for keeping the winding start portions of the wires 13 pressed in the locking groove 23c after they are inserted into the locking groove 23c. As shown in FIG. 1, the pressing mechanism 40 includes a swing piece 41, a rod 42, a fluid pressure cylinder 43, and a joint piece 44. The swing piece 41 extends in a radius direction of the rotation shaft 37a, and is pivotally supported by the rotation shaft 37a at a proximal end. The rod 42 is placed at the center of the rotation shaft 37a in an axially movable manner. The fluid pressure cylinder 43 is attached to the attachment member 38, and allows the rod 42 to reciprocate. A distal end of the rod 42 and the swing piece 41 are joined via the joint piece 44.

As shown in FIG. 3, a pressing portion 41a is formed at a distal end of the swing piece 41. The pressing portion 41a enters the locking groove 23c to press the winding start portions of the wires 13 that have been inserted into the locking groove 23c. One end of the joint piece 44 is pivotally supported by the distal end of the rod 42, whereas the other end of the joint piece 44 is pivotally supported by an intermediate portion of the swing piece 41. Therefore, when the fluid pressure cylinder 43 causes the rod 42 to reciprocate, the swing piece 41 that is joined to the rod 42 via the joint piece 44 swings around its proximal end. The swing piece 41 is swingable between a pressing position where the pressing portion 41a presses the wires 13 and a detached position where the pressing portion 41a is detached from the locking groove 23c. The pressing position and the detached position are respectively indicated by a dash-and-dot line and a solid line in FIG. 8.

Returning to FIG. 1, the coil manufacturing device 20 includes a taping device 70 as a wire bundling device that bundles the wires 13 suspended in the recesses 25 of the winding core 21. The taping device 70 attaches the adhesive tapes 12 of the predetermined length. The taping device 70 includes a tape feeding mechanism 71 for feeding the adhesive tapes 12 of the predetermined length.

Figure 4:
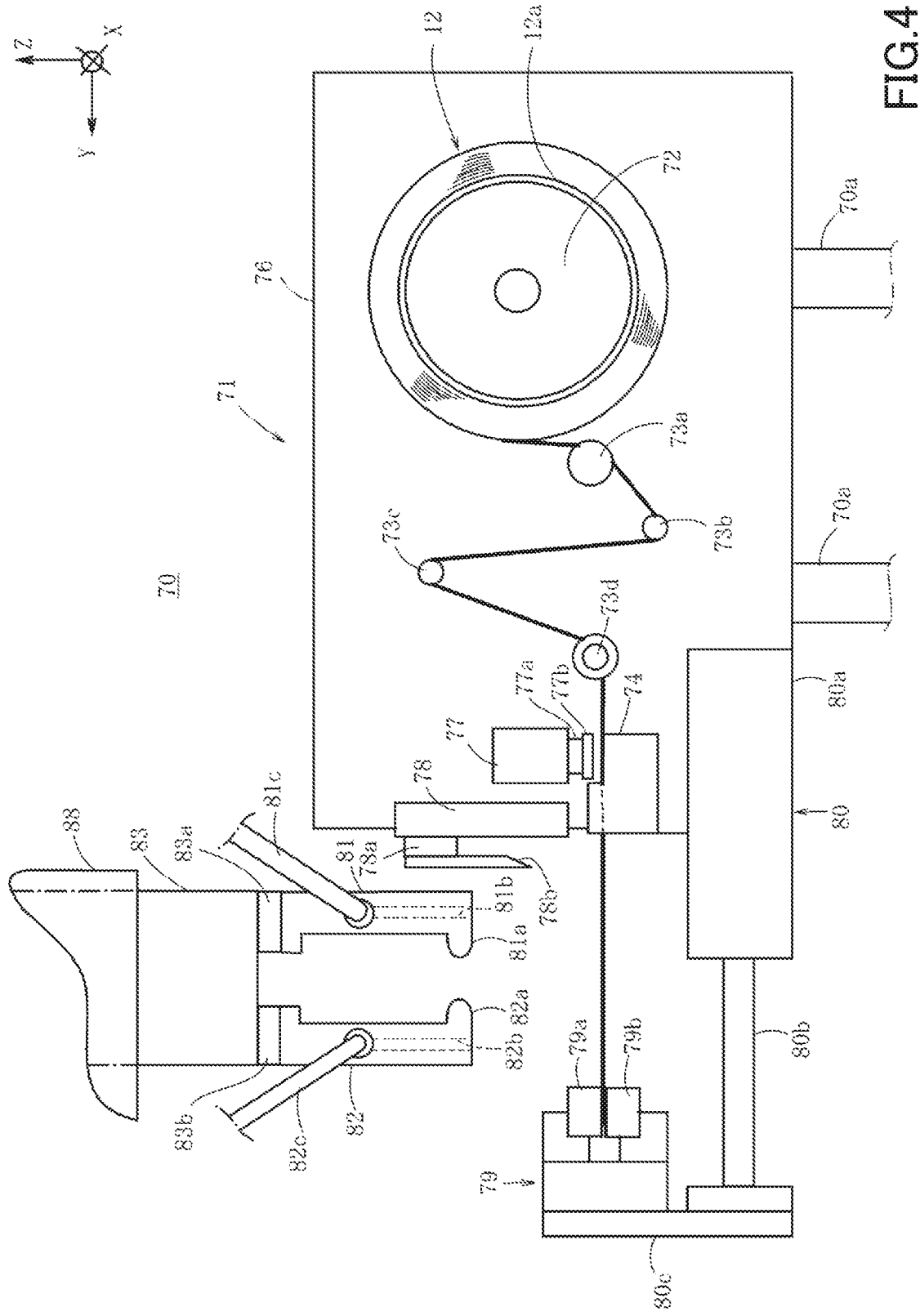
FIG. 4 is a view observed along arrows B of FIG. 1.

As shown in FIG. 4, the adhesive tapes 12 are produced from a long adhesive tape 12 that has a predetermined width w (FIG. 9) and is prepared in a state where it is wound around a core 12a with its adhesive surface facing inward. The tape feeding mechanism 71 includes a support shaft 72, a plurality of routing pulleys 73a to 73d, and an insertion member 74. The core 12a having the adhesive tape 12 wound therearound is fit onto the support shaft 72. The routing pulleys 73a to 73d route the unwound adhesive tape 12, and the unwound adhesive tape 12 passes through the insertion member 74.

As shown in FIG. 1, a vertical plate 76 extending in the Y-axis direction stands on the device mount 20a, and the support shaft 72, the routing pulleys 73a to 73d, and the insertion member 74 project in the X-axis direction from one surface of the vertical plate 76. After passing through the insertion member 74, the adhesive tape 12 is propelled while extending in the Y-axis direction with its adhesive surface facing downward.

The vertical plate 76 is attached to the device mount 20a via support pillars 70a. The vertical plate 76 is provided with a pressing fluid pressure cylinder 77 for stopping propelling of the adhesive tape 12 ahead of the insertion member 74, and a cutting fluid pressure cylinder 78 for cutting the adhesive tape 12 that has passed through the insertion member 74. The pressing fluid pressure cylinder 77 includes a rod 77a that advances/retracts by a supply/discharge of fluid. A pressing member 77b that prohibits a movement of the adhesive tape 12 by pressing the adhesive tape 12 against the insertion member 74 is provided at a projection end of the rod 77a.

The cutting fluid pressure cylinder 78 includes a moving piece 78a that moves in the Z-axis direction by a supply/discharge of fluid. A cutting blade 78b that can cut the adhesive tape 12 is attached to the moving piece 78a. When the moving piece 78a descends together with the cutting blade 78b, a lower end of the cutting blade 78b comes into contact with the adhesive tape 12 that has passed through the insertion member 74, thereby cutting the adhesive tape 12. When the moving piece 78a ascends together with the cutting blade 78b, the lower end of the cutting blade 78b is distanced from the adhesive tape 12 that has passed through the insertion member 74. Accordingly, the adhesive tape 12 can be pulled out.

The tape feeding mechanism 71 also includes a pinch member 79 that can pinch an end of the adhesive tape 12 that has passed through the insertion member 74, and a pullout fluid pressure cylinder 80 for pulling out the adhesive tape 12 by distancing the pinch member 79 from the insertion member 74. The pinch member 79 includes a pair of pinch pieces 79a, 79b that opens and closes by a supply/discharge of fluid. A body 80a of the pullout fluid pressure cylinder 80 is mounted on the vertical plate 76. A rod 80b advances/retracts in the Y-axis direction by a supply/discharge of fluid, and the pinch member 79 is attached to a projection end of the rod 80b via an attachment piece 80c.

While the pair of pinch pieces 79a, 79b is open, the pinch member 79 is moved toward the insertion member 74 so as to place a projection end of the adhesive tape 12 projecting from the insertion member 74 between the pair of pinch pieces 79a, 79b. In this state, the pair of pinch pieces 79a, 79b is closed to pinch the end of the adhesive tape 12. Thereafter, the pressing member 77b is distanced from the adhesive tape 12 by retracting the rod 77a of the pressing fluid pressure cylinder 77.

Then, the pinch member 79 pinching the end of the adhesive tape 12 is distanced from the insertion member 74 by projecting the rod 80b of the pullout fluid pressure cylinder 80. Consequently, the adhesive tape 12 can be pulled out by the predetermined length.

The taping device 70 further includes a pair of suction pieces 81, 82, a suction piece moving mechanism 84 (FIG. 1), and an approach mechanism 83 (FIG. 1). Both ends of a back surface of the adhesive tape 12 of the predetermined length fed by the tape feeding mechanism 71 are sucked (and held) by the pair of suction pieces 81, 82. The suction piece moving mechanism 84 moves the pair of suction pieces 81, 82 to allow the wires 13 suspended in the recesses 25 of the winding core 21 to pass between the pair of suction pieces 81, 82. The approach mechanism 83 causes the pair of suction pieces 81, 82 to approach each other.

The approach mechanism 83 is provided as a fluid pressure cylinder that can cause the pair of suction pieces 81, 82, which sucks both ends of the back surface of the adhesive tape 12 of the predetermined length, to move toward or away from each other. The pair of suction pieces 81, 82 in a distanced state is moved so that lower surfaces of the suction pieces 81, 82 come into contact with and suck the adhesive tape 12 that has been pulled out by the predetermined length. In this state, the rod 77a of the pressing fluid pressure cylinder 77 is projected, thereby causing the pressing member 77b to prohibit a movement of the adhesive tape 12 ahead of the insertion member 74.

Then, the taping device 70 lowers the cutting blade 78b to cut the adhesive tape 12 that has passed through the insertion member 74. As a result, the adhesive tape 12 of the predetermined length sucked by the pair of suction pieces 81, 82 becomes independent.

As shown in FIG. 1, the fluid pressure cylinder 83 serving as the approach mechanism is attached to the device mount 20a via the suction piece moving mechanism 84. The suction piece moving mechanism 84 is composed of a combination of extendable actuators 85 to 87 for the X-axis, Y-axis, and Z-axis directions. A housing 87d of the extendable actuator 87 for the X-axis direction is movable in the three axis directions relative to the device mount 20a. As the suction piece moving mechanism 84 is constructed in the same manner as the aforementioned nozzle moving mechanism 52, a detailed description thereof will be redundant and hence omitted.

An attachment plate 88 is attached to the housing 87d of the extendable actuator 87 for the X-axis direction, the housing 87d being movable in the three axis directions relative to the device mount 20a. The fluid pressure cylinder 83 serving as the approach mechanism is attached to the attachment plate 88 in such a manner that movable pieces 83a, 83b are pointed downward.

As shown in FIG. 4, the fluid pressure cylinder 83 serving as the approach mechanism causes the pair of movable pieces 83a, 83b to move toward or away from each other in the Y-axis direction by a supply/discharge of fluid. The suction pieces 81, 82 are attached to the movable pieces 83a, 83b, respectively.

The pair of suction pieces 81, 82 is attached so as to extend downward from the movable pieces 83a, 83b. Extended portions 81a, 82a that approach each other are formed at lower ends of the pair of suction pieces 81, 82. Holes 81b, 82b for sucking the adhesive tape 12 of the predetermined length are formed so as to extend upward from the lower surfaces of the pair of suction pieces 81, 82. Upper ends of the holes 81b, 82b are connected to flexible hoses 81c, 82c for suctioning air through the holes 81b, 82b. Via the flexible hoses 81c, 82c, air is suctioned through the holes 81b, 82b that open at the lower ends of the pair of suction pieces 81, 82. As a result, the lower ends of the pair of suction pieces 81, 82 suck the adhesive tape 12 upon coming into contact with the adhesive tape 12.

Figure 9:
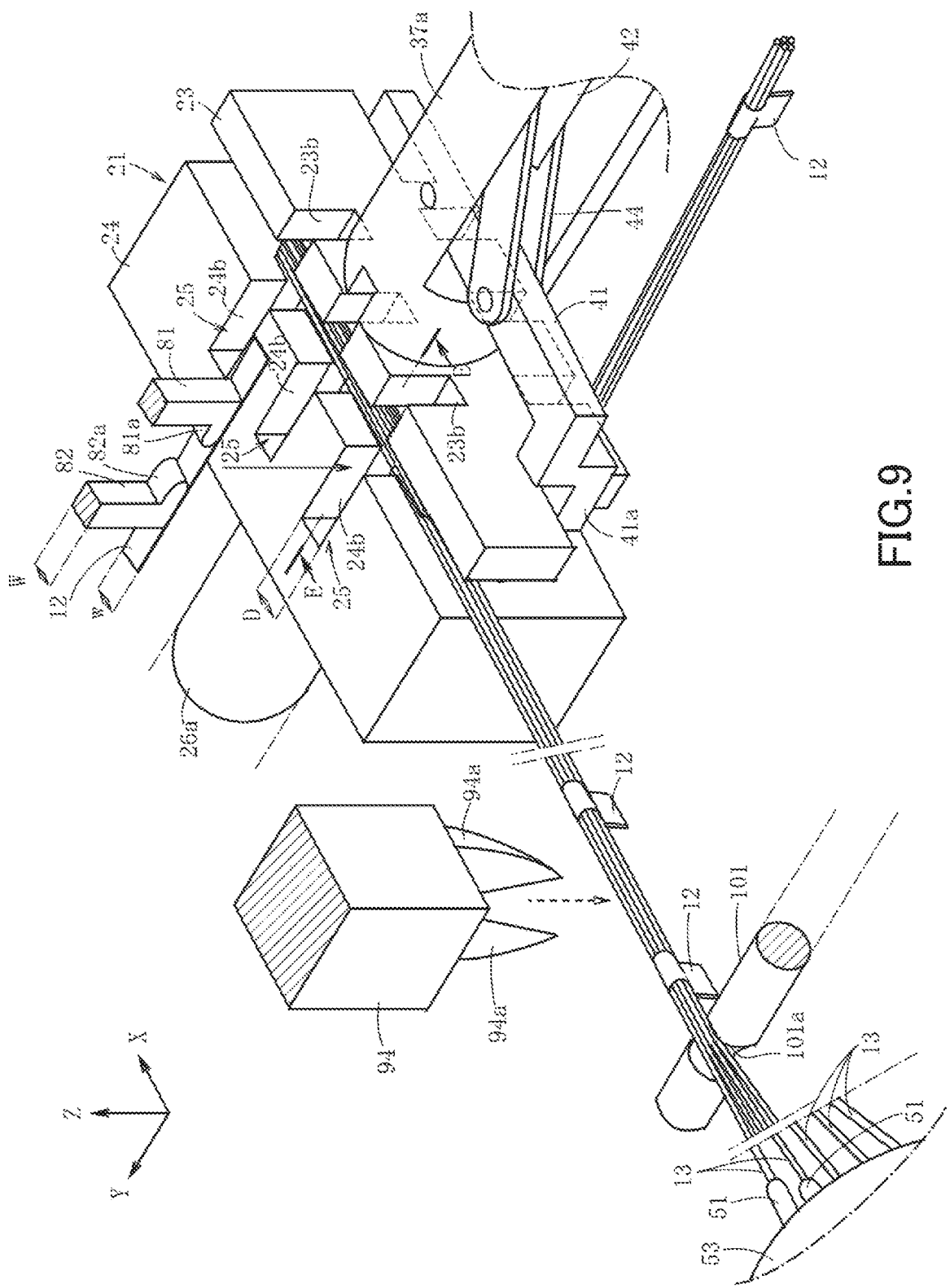
FIG. 9 is a perspective view of a wound state of the wires achieved by rotation of the winding core.

As shown in FIG. 9, the width w of the adhesive tape 12 used herein is smaller than the width D of the recesses 25 of the winding core 21 in the X-axis direction. The width W of the pair of suction pieces 81, 82 in the X-axis direction is substantially the same as the width w of the adhesive tape 12.

As shown in FIG. 10, the fluid pressure cylinder 83 serving as the approach mechanism is formed in such a manner that, when the pair of movable pieces 83a, 83b is distanced from each other, the interval h between the extended portions 81a, 82a of the pair of suction pieces 81, 82 attached to the movable pieces 83a, 83b becomes larger than the thickness H of the coil edge 11b of the coil body 11 to be obtained in the axial direction. The suction piece moving mechanism 84 (FIG. 1) moves the pair of suction pieces 81, 82, together with the fluid pressure cylinder 83 serving as the approach mechanism, to allow the wires 13 suspended in the recesses 25 of the winding core 21 to pass between the pair of suction pieces 81, 82.

As shown in FIG. 2, the coil manufacturing device 20 further includes first and second clamp devices 90, 91 that grip the plurality of wires 13, first and second moving mechanisms 92, 93 for moving the first and second clamp devices 90, 91 separately, and a cutter device 94 (JP 2011-217824A) that can cut the plurality of wires 13 simultaneously.

The first moving mechanism 92 is placed atop the attachment member 38. The second moving mechanism 93 is placed atop the support plate 28. The first moving mechanism 92 is composed of a combination of extendable actuators 92a to 92c for the X-axis, Y-axis, and Z-axis directions. The second moving mechanism 93 is composed of a combination of extendable actuators 93a to 93c for the X-axis, Y-axis, and Z-axis directions. Each of housings of the extendable actuators 92c, 93c for the Y-axis direction is movable in the three axis directions relative to the device mount 20a. As the first and second moving mechanisms 92, 93 are constructed in the same manner as the aforementioned nozzle moving mechanism 52 and the suction piece moving mechanism 84, a detailed description thereof will be redundant and hence omitted.

Figure 5:
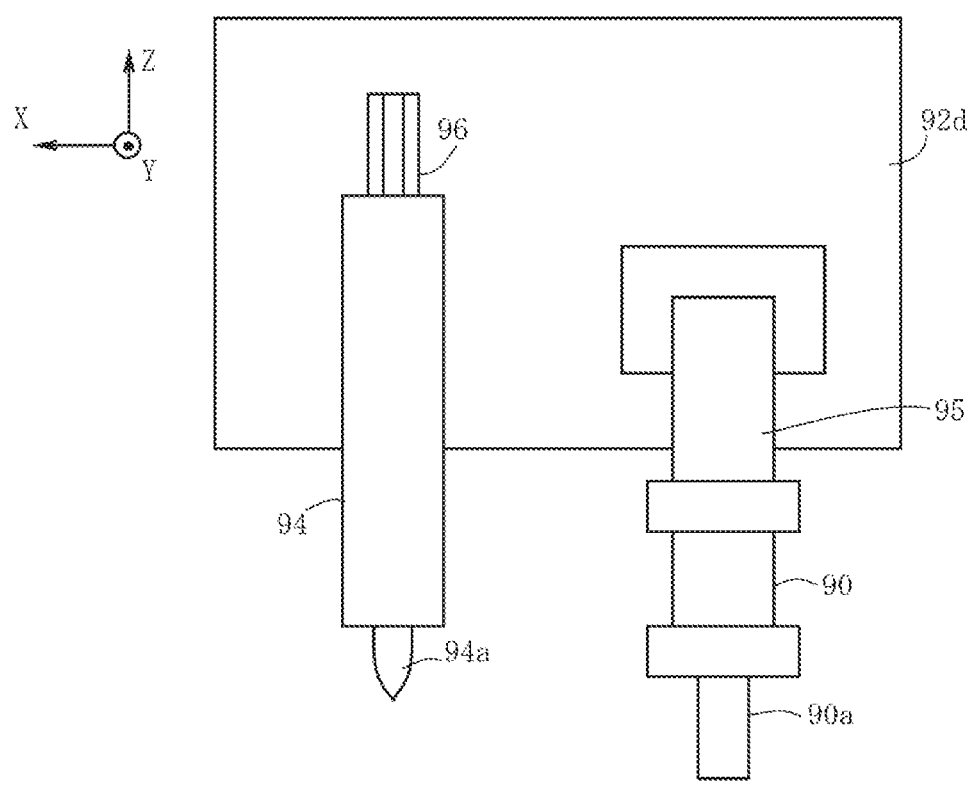
FIG. 5 is a view observed along arrows C of FIG. 2.

As shown in FIGS. 2 and 5, a first movable plate 92d is attached to the housing of the extendable actuator 92c for the Y-axis direction of the first moving mechanism 92, the housing being movable in the three axis directions relative to the device mount 20a. The first clamp device 90 and the cutter device 94 are mounted on the first movable plate 92d. The first clamp device 90 is attached to the first movable plate 92d via a first rotation motor 95 that causes the first clamp device 90 to rotate on a horizontal plane (X-Y plane), with pinch pieces 90a of the first clamp device 90 projecting downward.

The cutter device 94 is attached to the first movable plate 92d via a first fluid pressure cylinder 96 that moves the cutter device 94 up and down in the vertical direction (Z-axis direction), with cutter blades 94a of the cutter device 94 pointed downward. When the cutter device 94 has been placed in a lowered state by the first fluid pressure cylinder 96, the cutter blades 94a reach the wires 13 extending in the horizontal direction (Y-axis direction). The cutter device 94 can cut the wires 13 by closing the cutter blades 94a while the wires 13 are placed between the cutter blades 94a.

Figure 6:
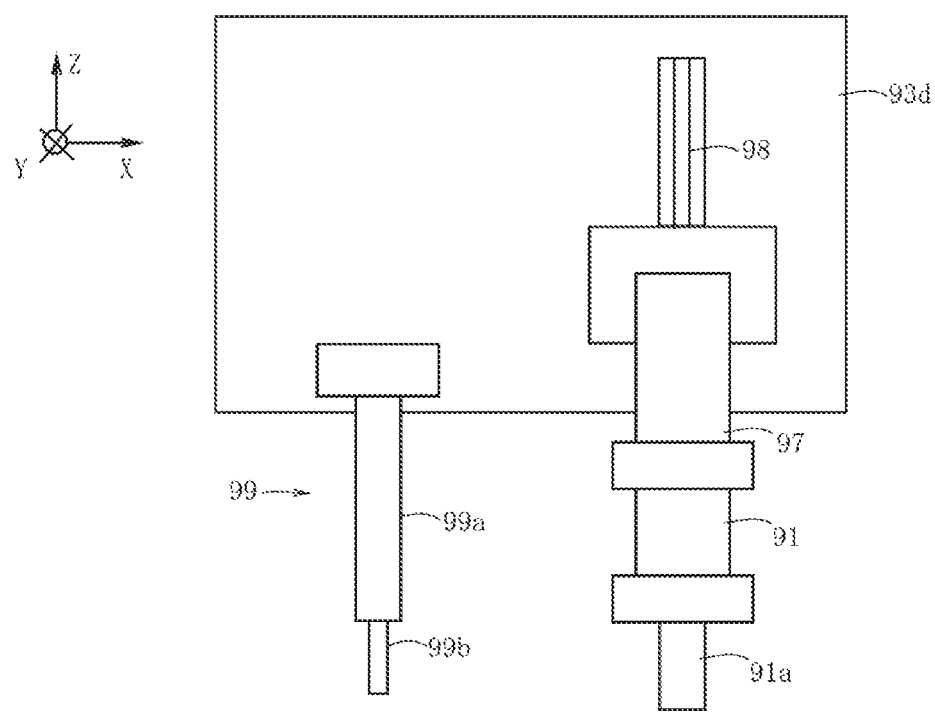
FIG. 6 is a view observed along arrows D of FIG. 2.

As shown in FIGS. 2 and 6, a second movable plate 93d is attached to the housing of the extendable actuator 93c for the Y-axis direction of the second moving mechanism 93, the housing being movable in the three axis directions relative to the device mount 20a. The second clamp device 91 is mounted on the second movable plate 93d. The second clamp device 91 is attached to the second movable plate 93d via a second rotation motor 97 and a second fluid pressure cylinder 98, with pinch pieces 91a of the second clamp device 91 projecting downward. The second rotation motor 97 causes the second clamp device 91 to rotate on the horizontal plane. The second fluid pressure cylinder 98 moves the second rotation motor 97, together with the second clamp device 91, up and down in the vertical direction.

Figure 8:
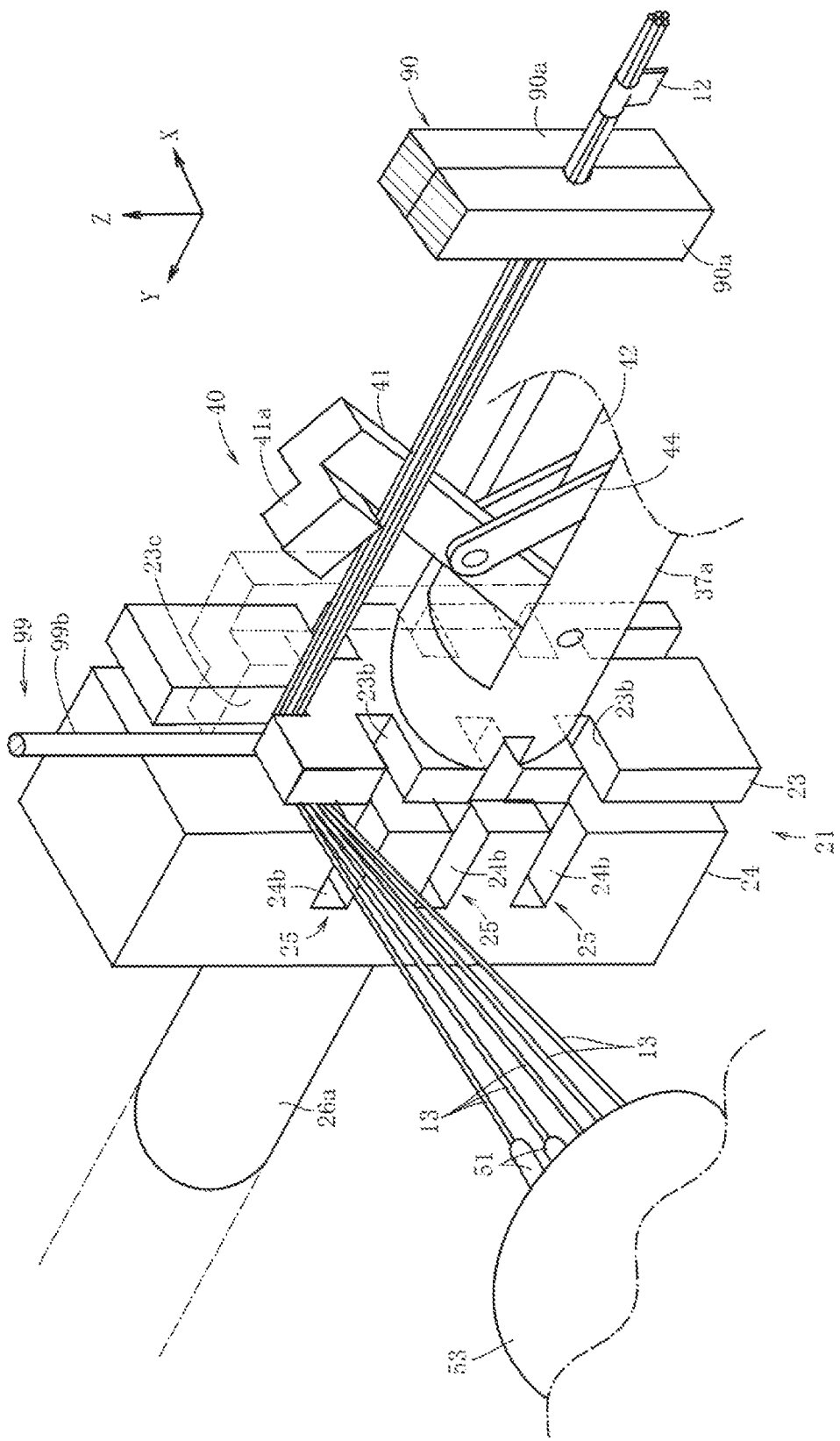
FIG. 8 is a perspective view of locking of the bent winding start portions of the wires in the winding core.

A bar 99 extending in the vertical direction (Z-axis direction) is attached to the second movable plate 93d. The bar 99 is used to bend the wires 13 on the horizontal plane (X-Y plane). An upper end of the bar 99 is attached to the second movable plate 93d in such a manner that the bar 99 projects downward from a lower edge of the second movable plate 93d. The bar 99 includes an upper portion 99a having a rectangular cross-section, and a lower portion 99b that has a narrow, elongated shape so as to be insertable into a gap between the fixed-side flange 23 and the movable-side flange 24 of the winding core 21 (FIG. 8).

Returning to FIG. 1, a support bar 101 that supports, from below, the wires 13 extending from the nozzles 51 to the winding core 21 is mounted on the device mount 20a in an ascendable and discendible manner. As shown in FIG. 9, a recess 101a that makes the plurality of wires 13 fall therein to unite the plurality of wires 13 is formed in the support bar 101. As shown in FIG. 1, a fluid pressure cylinder 102 that causes the support bar 101 to ascend and descend in a level state is attached to the device mount 20a.

A description is now given of a coil manufacturing method that uses the coil manufacturing device 20.

A coil manufacturing method according to the present embodiment is a method of manufacturing the coil 10 by rotating the winding core 21 and winding the wires 13 around the rotating winding core 21.

The coil manufacturing method has the following features: the recesses 25 in which the wires 13 wound around the winding core 21 are suspended are formed in the winding core 21, and a taping process of attaching the adhesive tapes 12 is performed as a wire bundling process of bundling the wires 13 suspended in the recesses 25 after winding the wires 13 around the winding core 21.

In the present embodiment, five wires 13 are wound simultaneously. Although not illustrated, the five wires 13 are reserved while being separately wound around drums, and are separately fed via a non-illustration tension device.

As shown in FIG. 7, the five wires 13 are separately inserted through the nozzles 51 and fed so as to extend parallel to one another in the X-axis direction. Wire winding is started in a state where ends of the five wires 13 are bundled by the adhesive tape 12 of the predetermined length. Winding start portions of the wires 13 are bent in the bundled state at a substantially right angle.

Specifically, while gripping the ends of the wires 13, the first clamp device 90 bends the wires 13 by causing the wires 13 to revolve around the bar 99 in a state where the wires 13 are running along the upper portion 99a of the bar 99. At this time, in order to bend the plurality of wires 13 on the same horizontal plane, the plurality of nozzles 51 are aligned in the horizontal direction. The bar 99 is moved by the second moving mechanism 93. The first clamp device 90 is moved and rotated by the first rotation motor 95 and the first moving mechanism 92.

As shown in FIG. 8, the bent winding start portions of the wires 13 are locked by the winding core 21. At this time, the winding core 21 is rotated so that the locking groove 23c is located above, and the bent winding start portions of the wires 13 are inserted from an upper side toward a lower side of the locking groove 23c.

After the bent winding start portions of the wires 13 are inserted into the locking groove 23c, the pressing portion 41a of the swing piece 41 enters the locking groove 23c, thereby locking the winding start portions of the wires 13 in the locking groove 23c.

The fluid pressure cylinder 43 swings the swing piece 41 by projecting the rod 42. This causes the pressing portion 41a to move to the pressing position indicated by the dash-and-dot line in FIG. 8, where the pressing portion 41a presses the wires 13. As a result, the pressing portion 41a enters the locking groove 23c. Until the pressing portion 41a presses the wires 13, the wires 13 are locked as follows: the second moving mechanism 93 (FIG. 2) causes the lower portion 99b of the bar 99 to enter the locking groove 23c, thereby pressing the winding start portions of the wires 13.

In wire winding, the movable-side flange 24, together with the winding barrel 22, is moved toward the fixed-side flange 23 so as to bring the projection end of the winding barrel 22 into contact with the fixed-side flange 23. Then, the winding core 21 made up of the fixed-side flange 23, the winding barrel 22, and the movable-side flange 24 is rotated. As a result, the five wires 13 propelled through the nozzles 51 are wound simultaneously.

The wires 13 are wound around the winding barrel 22 by rotation of the winding core 21 caused by simultaneous driving of the movable-side motor 26 and the fixed-side motor 37. The winding width of the wires 13 is restricted by the fixed-side flange 23 and the movable-side flange 24.

The plurality of nozzles 51 are aligned in the vertical direction so as to guide the plurality of wires 13 propelled through the plurality of nozzles 51 to the winding barrel 22 interposed between the fixed-side flange 23 and the movable-side flange 24. The direction of alignment of the plurality of nozzles 51 changes as the nozzle base 53 is rotated by the servomotor 61.

After the wires 13 are wound around the winding core 21, the taping process is performed. In the taping process, the adhesive tapes 12 of the predetermined length are attached to the wires 13 suspended in the recesses 25 of the winding core 21. The wires 13 wound around the winding core 21 constitute the coil body 11 (FIG. 12). The winding start portions and the winding end portions of the wires 13 extend from the coil edges 11a, 11b. The adhesive tapes 12 of the predetermined length are attached to each of the coil edges 11a, 11b. At first, the adhesive tapes 12 are attached to the coil edge 11b that is continuous with the winding end portions of the wires 13.

In the taping process that uses the aforementioned coil manufacturing device 20, the pair of suction pieces 81, 82 that sucks both ends of the back surface of the adhesive tape 12 of the predetermined length is moved so as to enter the inside of the recess 25, as indicated by a solid-line arrow in FIG. 9. In order to allow the wires 13 suspended in the recess 25 of the winding core 21 to pass between the pair of suction pieces 81, 82, the pair of suction pieces 81, 82 is positioned as shown in FIG. 10A. Thereafter, as shown in FIG. 10B, the suction pieces 81, 82 approach each other. In this state, the wires 13 pass between the pair of suction pieces 81, 82, and then the adhesive tape 12 of the predetermined length is attached to surround the wires 13 suspended in the recess 25, as shown in FIG. 10C.

In the coil edge 11b that is continuous with the winding end portions of the wires 13, the adhesive tape 12 of the predetermined length is attached in each of three recesses 25.

As shown in FIG. 9, the adhesive tape 12 is also attached to the plurality of wires 13 extending between the winding core 21 and the nozzles 51. The wires 13 extending between the winding core 21 and the nozzles 51 are not bundled. Therefore, the five wires 13 that are respectively propelled through the five nozzles 51 are bundled in the vicinity of the nozzles 51 by raising the support bar 101. The adhesive tape 12 is attached to the wires 13 thus bundled.

The adhesive tape 12 is attached to the wires 13 at two locations between the support bar 101 and the winding core 21. The cutter device 94 descends as indicated by a dash-line arrow, and cuts the wires 13 between the two locations. As a result, the adhesive tape 12 that has been attached to the plurality of wires 13 remaining through the nozzles 51 in the bundled state serves as the adhesive tape 12 that maintains the bundled state of the plurality of wires 13, that is to say, bundles the winding start portions of the wires 13 to be wound next.

After the cutter device 94 has cut the wires 13, the wires 13 remaining at the winding core 21 side constitute the winding end portions of the wires 13 of the coil body 11, and the adhesive tape 12 attached to the winding end portions of the wires 13 maintains the bundled state of the winding end portions of the wires 13.

After the adhesive tapes 12 have been attached to the coil edge 11b that is continuous with the winding end portions of the wires 13, the movable-side motor 26 and the fixed-side motor 37 rotate the winding core 21 by 180 degrees. As a result, the coil edge 11a that is continuous with the winding start portions of the wires 13 is located above in the vertical direction in a level state as shown in FIG. 11.

Then, at the coil edge 11a that is continuous with the winding start portions of the wires 13, the adhesive tapes 12 are attached to the wires 13 suspended in the recesses 25 of the winding core 21. As attachment of the adhesive tapes 12 in the recesses 25 is the same as the aforementioned attachment at the coil edge 11b that is continuous with the winding end portions of the wires 13, a description thereof will be redundant and hence omitted.

Once the adhesive tapes 12 have thus been attached to both of the coil edges 11a, 11b that are continuous with the winding start portions and the winding end portions of the wires 13, respectively, the shape of the coil body 11 made up of the wires 13 wound around the winding core 21 is maintained. Thereafter, the winding start portions of the wires 13 are extended straight so as to be continuous with the coil edge 11a.

Figure 11:
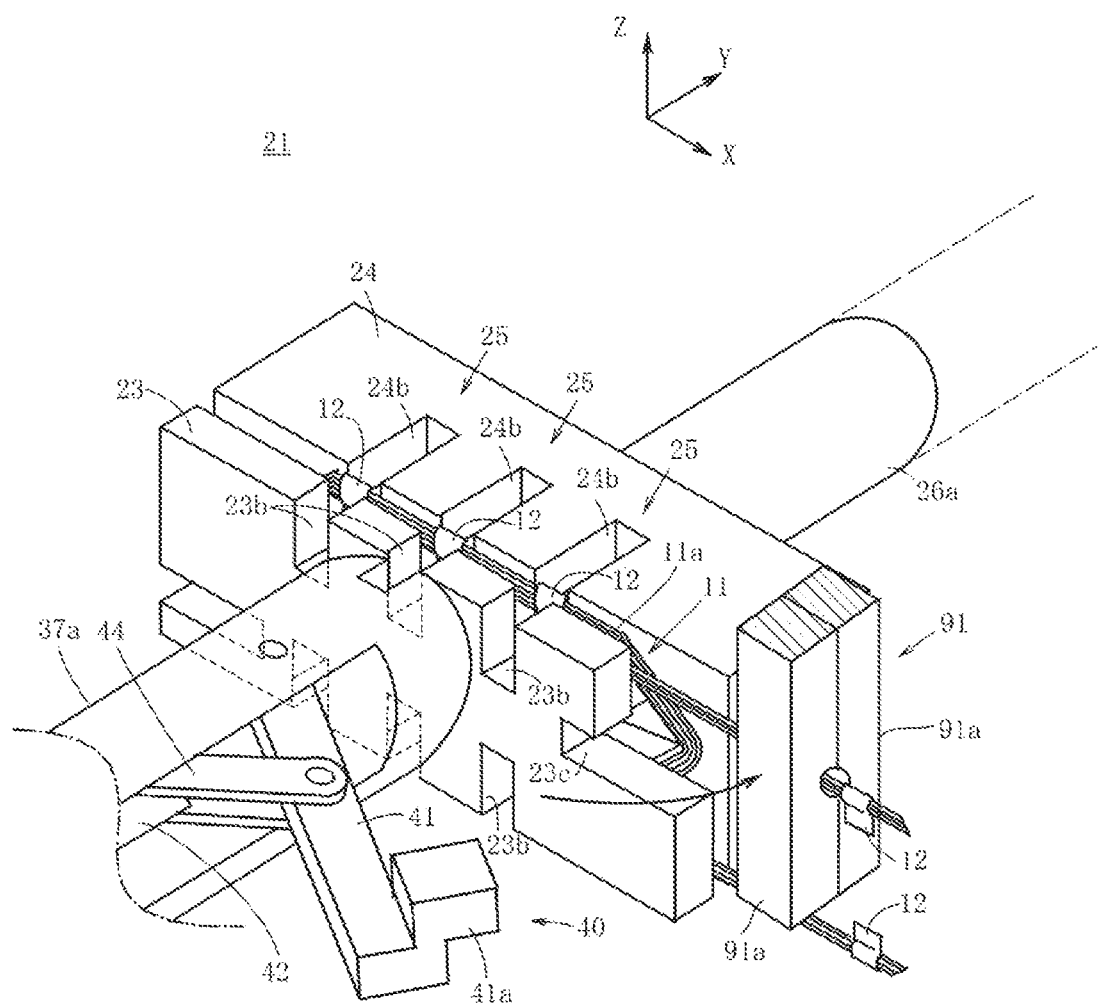
FIG. 11 is a perspective view of straightening of the winding start portions of the wires.

In order to extend the winding start portions of the wires 13, as shown in FIG. 11, ends of the bent winding start portions of the wires 13 are gripped by the second clamp device 91, and moved while rotating the second clamp device 91. As a result, the winding start portions of the wires 13 are moved to lie on an imaginary extension line of the coil edge 11a. The second clamp device 91 is moved and rotated by the second rotation motor 97 and the second moving mechanism 93 (FIG. 2).

As shown in FIG. 12, the movable-side flange 24, together with the winding barrel 22, is moved away from the fixed-side flange 23, and the winding barrel 22 is retracted into the movable-side flange 24. As a result, the coil 10 made up of the adhesive tapes 12 and the coil body 11 that has been maintained in shape due the adhesive tapes 12 attached thereto is obtained.

As such, with the coil manufacturing device 20 and the coil manufacturing method according to the present embodiment, the wires 13 are wound around the winding core 21, and the adhesive tapes 12 are attached to the wires 13 suspended in the recesses 25 formed in the winding core 21. In this way, the adhesive tapes 12 prevent an independent movement of the wires 13, and maintain the bundled state of the wires 13. Therefore, for example, even if the wires 13 are relatively thick, the shape of the coil body 11 made up of the wires 13 wound around the winding core 21 is maintained by the adhesive tapes 12, and the shape of the coil 10 made up of the coil body 11 and the adhesive tapes 12 is maintained.

The taping device 70 includes the pair of suction pieces 81, 82 that sucks both ends of the back surface of the adhesive tape 12 of the predetermined length, the suction piece moving mechanism 84 for moving the pair of suction pieces 81, 82, and the approach mechanism 83 for causing the pair of suction pieces 81, 82 to approach each other. The taping device 70 made up of these components does not have a large size compared to current application equipment and heating equipment that have been conventionally required. Therefore, even if the wires 13 are relatively thick, the coil manufacturing device 20 and the coil manufacturing method can reliably maintain the shape of the obtained coil 10 without increasing the size of the coil manufacturing device 20.

Figure 13:
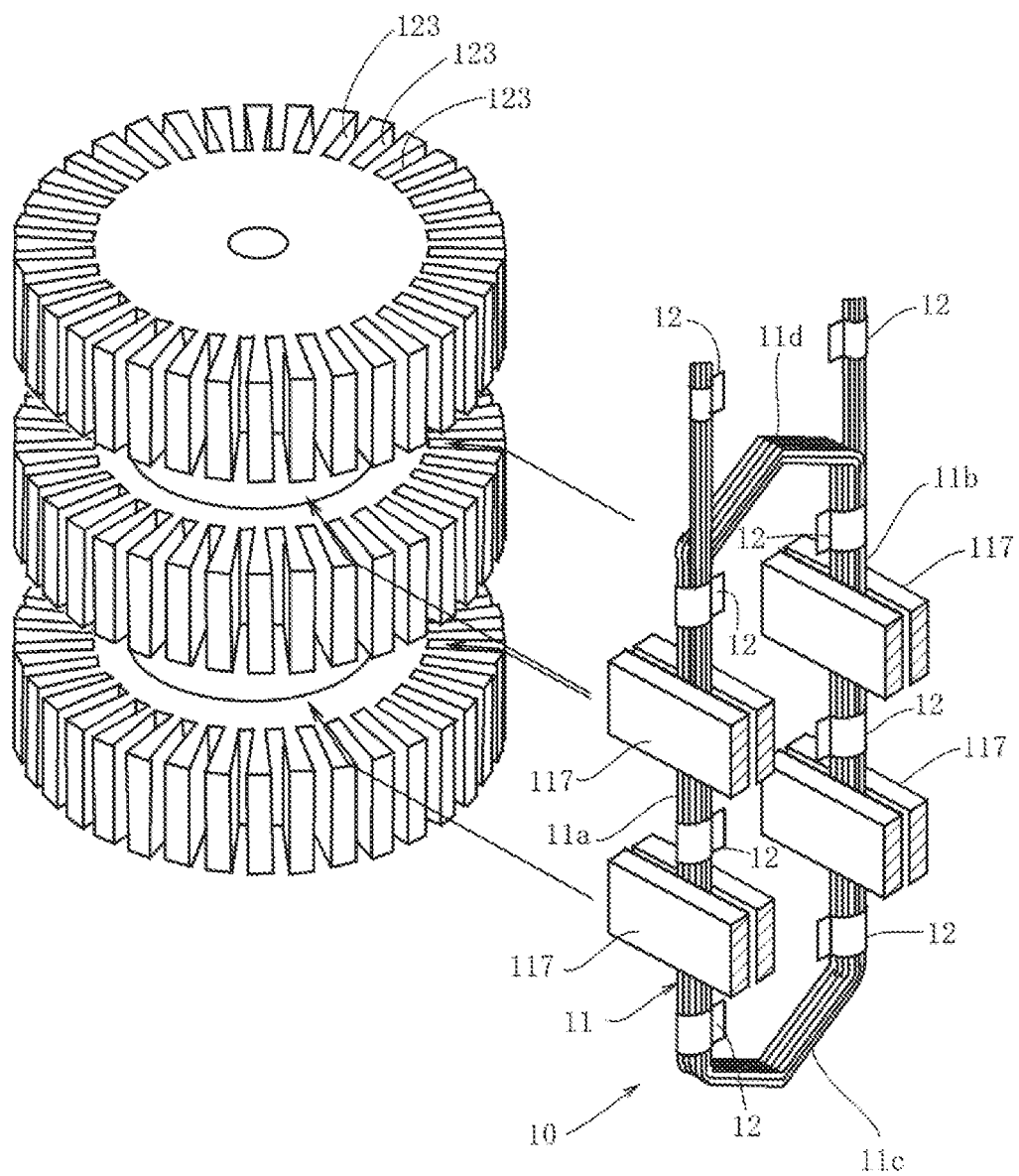
FIG. 13 is a perspective view of insertion of a pair of coil edges of the obtained coil into holding grooves of a jig.
Figure 14:
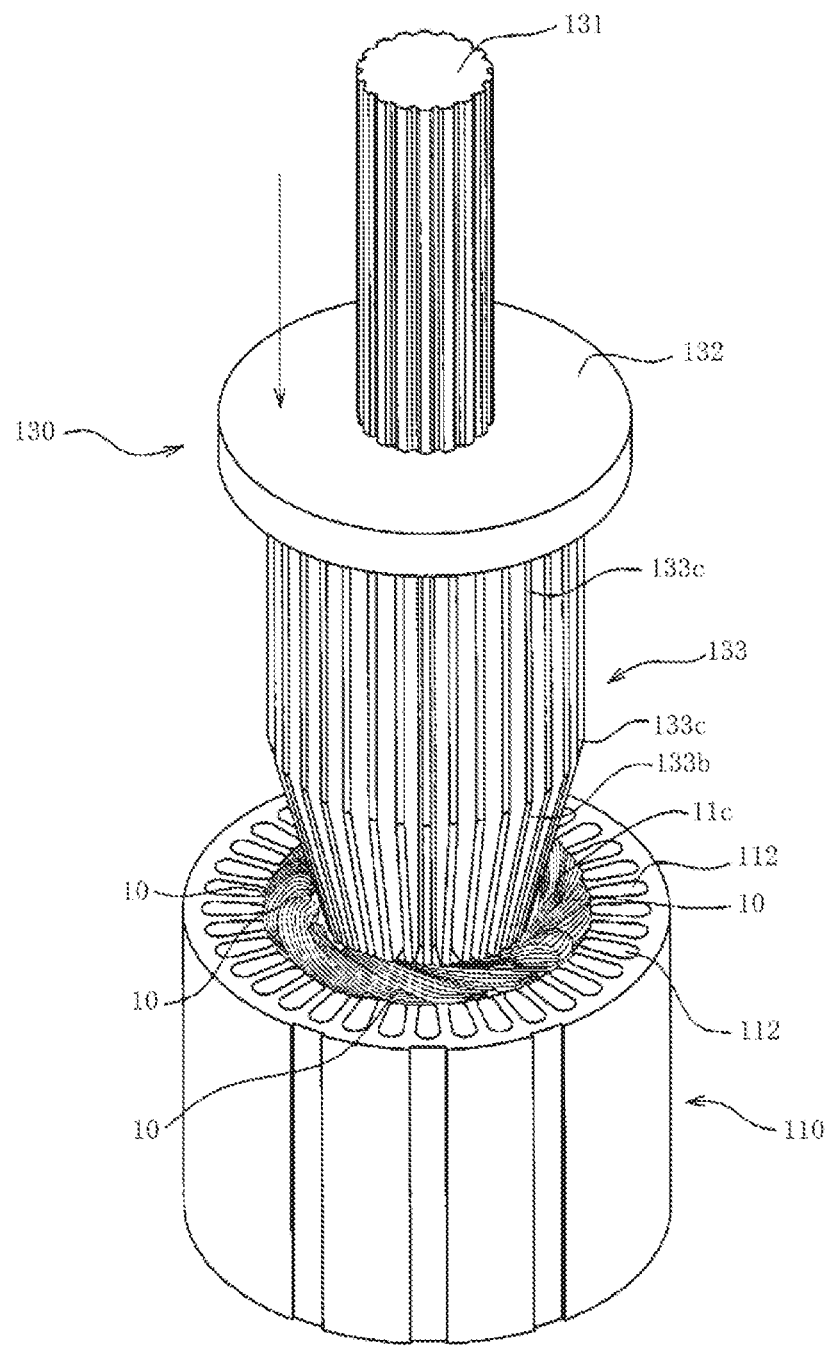
FIG. 14 is a perspective view of insertion of pushers of a pressing jig into corresponding holding grooves of the jig.
Figure 15:
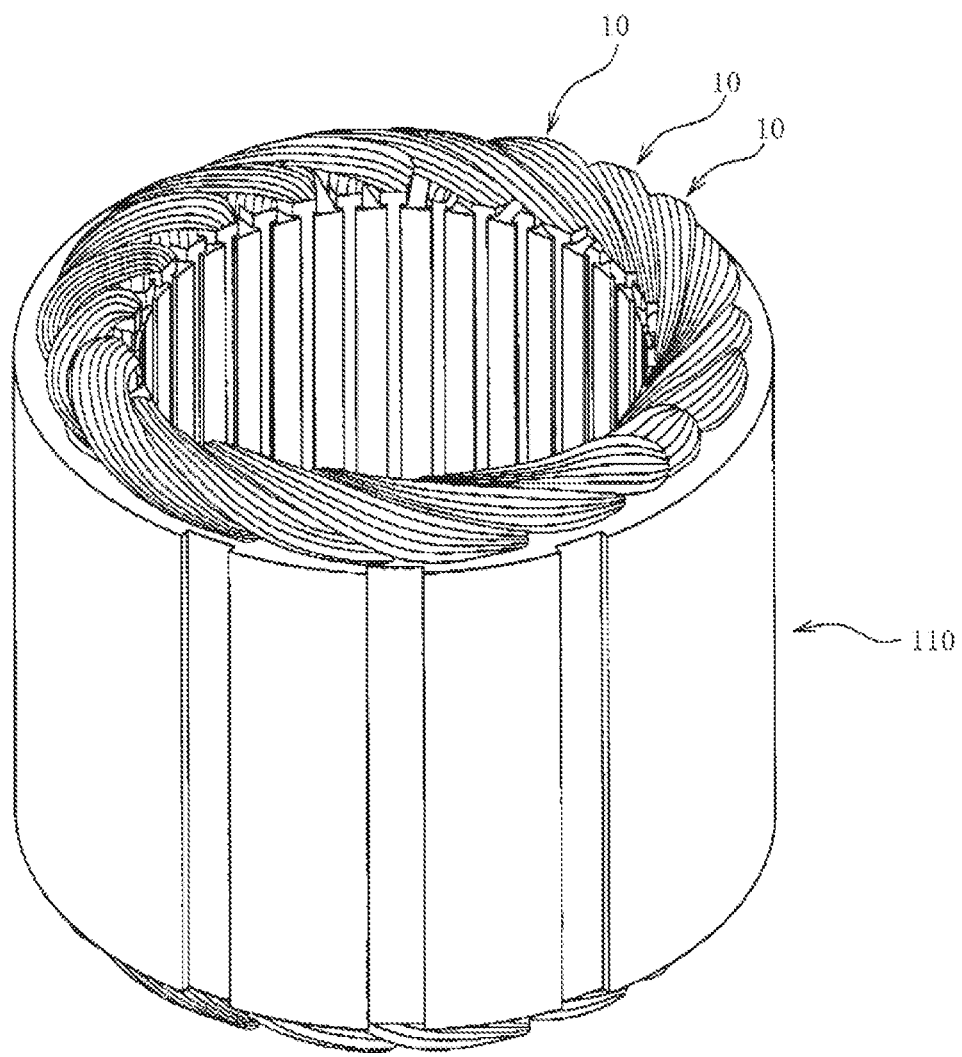
FIG. 15 is a perspective view of a stator obtained by inserting a plurality of coils into slots.

The coil 10 thus maintained in shape has the pair of coil edges 11a, 11b that is mounted inside the slots of the stator core, and constitutes the stator together with the stator core. FIGS. 13 to 15 show an example in which the pair of coil edges 11a, 11b is moved in a radius direction of the stator core and mounted inside the slots thereof.

FIG. 13 shows an insertion jig 121 that is inserted into the inner circumference of a stator core 110 (FIGS. 14 and 15). The entire length of the insertion jig 121 is substantially equal to the entire length of the stator core 110. The insertion jig 121, as a whole, is formed into a substantially columnar shape. A plurality of holding grooves 123 are formed in a radial fashion in the outer circumference of the insertion jig 121 formed into the columnar shape.

The holding grooves 123 are formed in correspondence with slots 112 of the stator core 110. That is to say, the holding grooves 123 are formed with the same pitch as the slots 112 of the stator core 110, and the number of the holding grooves 123 formed in the outer circumference of the insertion jig 121 is the same as the number of the slots 112. The holding grooves 123 are formed to extend radially from the outer circumference of the insertion jig 121, across the entire length of the insertion jig 121 in a longitudinal direction.

The coil 10 serves as a stator coil mounted in the stator core 110. The necessary number of coils 10 are manufactured in advance in line with the present embodiment. Each of the plurality of coils 10 has the pair of coil edges 11a, 11b that is inserted into corresponding holding grooves 123 of the insertion jig 121. All of the coils 10 that have been manufactured in advance are arranged along the circumference of the insertion jig 121.

The pairs of coil edges 11a, 11b of the plurality of coils 10 are inserted into the group of holding grooves 123. To this end, FIG. 13 shows a case in which the coil edges 11a, 11b are pinched by gripping instruments 117 and inserted into the group of holding grooves 123 by moving the gripping instruments 117, together with the coil edges 11a, 11b, using a non-illustrated actuator.

FIG. 13 shows the case in which both of the coil edges 11a, 11b made of the wires 13 are directly gripped by the gripping instruments 117. Alternatively, where necessary, both of the coil edges 11a, 11b may be covered by insulating paper, tape, or the like in advance for insulation, and the gripping instruments 117 may grip both of the coil edges 11a, 11b thus insulated.

Once the plurality of coils 10 have been arranged along the outer circumference of the insertion jig 121, the insertion jig 121 in this state is inserted into the inner circumference of the stator core 110 as shown in FIG. 14. FIG. 14 shows a state where the insertion jig 121 has been completely inserted into the inner circumference of the stator core 110. In FIG. 14, only the coil ends 11c are shown among the coils 10 arranged around the insertion jig 121.

As shown in FIG. 14, the coil edges 11a, 11b of the coils 10 held in the holding grooves 123 of the insertion jig 121 are pushed radially outward using a pressing jig 130, thereby inserting the coil edges 11a, 11b into corresponding slots 112 of the stator core 110.

The pressing jig 130 includes a guide shaft 131, a pressing body 132 slidably mounted on the guide shaft 131, and a plurality of plate-shaped pushers 133 attached to the pressing body 132. The number of the pushers 133 is the same as the number of the holding grooves 123 of the insertion jig 121. The pushers 133 are attached to the pressing body 132 in such a manner that they can enter the holding grooves 123 and they extend radially around the guide shaft 131. A tapered portion 133b and a wide portion 133c are formed in each pusher 133. The tapered portion 133b gradually increases in width from its distal end toward the pressing body 132, and has a linear shape or a shape having a relatively large curvature. The wide portion 133c extends from the tapered portion 133b to the pressing body 132, and has a constant width.

The pressing jig 130 is placed atop the insertion jig 121. Sliding the pressing body 132 downward relative to the guide shaft 131 causes the pushers 133 to be inserted into the holding grooves 123 from lower ends thereof. As a result, distal ends and the tapered portions 133b of the pushers 133 enter the holding grooves 123 in this order.

On entering the holding grooves 123, the tapered portions 133b push the coil edges 11a, 11b of the coils 10, which have been inserted into the holding grooves 123, outward in a radius direction of the insertion jig 121. As a result, the coil edges 11a, 11b that have been inserted into the holding grooves 123 are inserted into the slots 112 of the stator core 110, and a stator 109 made up of the stator core 110 and the plurality of coils 10 is obtained as shown in FIG. 15.

The coil edges 11a, 11b of the coils 10 are inserted into the slots 112 of the stator core 110 by pushing the coil edges 11a, 11b outward in the radius direction from the inner circumference of the stator core 110. In this way, the plurality of coils 10 that have been mounted in the insertion jig 121 in advance are mounted in the stator core 110 as-is without changing their positions. Therefore, by forming the coil edges 11a, 11b of the coils 10 in advance through alignment and winding into bundles having a cross-section corresponding to a cross-section of the slots 112, they can be mounted in the slots 112 while maintaining their shapes. This can improve the density, that is to say, the space factor of the coils 10 mounted inside the slots 112.

Furthermore, the shapes of the coil ends 11c, 11d projecting from an end surface of the stator core 110 are maintained to be the same as the shapes of the coil ends 11c, 11d of the coils 10 held by the insertion jig 121. This allows the coil ends 11c, 11d to be compact and project uniformly while the plurality of coils 10 are mounted in the insertion jig 121. Thus, the coil ends 11c, 11d are compact and project uniformly in the obtained stator 109.

In the above description of the embodiment, the nozzle moving mechanism 52, the suction piece moving mechanism 82, and the like are each composed of a combination of extendable actuators for the X-axis, Y-axis, and Z-axis directions. However, these moving mechanisms are not limited to being constructed in this way, and may be constructed in any other way as long as the nozzles 51, the suction pieces 81, 82, and the like are movable in the three axis directions relative to the device mount 20a.

In the above description of the embodiment, the coil body 11 is made up of five wires 13, and five nozzles 51 are prepared through which the wires 13 are inserted. However, the coil body may be made up of one, two, three, four, or not less than six wires 13, in which case it is sufficient that the number of prepared nozzles be the same as the number of the wires 13.

The nozzles 51 through which the wires 13 pass are not limited to having a tubular shape, and may be nozzles made by boring a plurality of insertion holes through a block body, in which case the wires pass through the insertion holes.

In the above description of the embodiment, the winding barrel 22 is retractable into the movable-side flange 24. Alternatively, the winding barrel 22 may be retractable into the fixed-side flange 23.

In the above description of the embodiment, the taping device 70 is used as a wire bundling mechanism. Alternatively, the plurality of wires 13 may be bundled by fusing.

Embodiments of this invention were described above, but the above embodiments are merely examples of applications of this invention, and the technical scope of this invention is not limited to the specific constitutions of the above embodiments.

This application claims priority based on Japanese Patent Application No. 2014-162252 filed with the Japan Patent Office on Aug. 8, 2014, the entire contents of which are incorporated into this specification.

The invention claimed is:

1. A coil manufacturing device for manufacturing a coil by rotating a winding core and winding a wire around the rotating winding core, the coil manufacturing device comprising:
   a recess formed in the winding core, the recess being configured to suspend the wire wound around the winding core in the recess; and a wire bundling device configured to bundle the wire suspended in the recess, wherein the winding core includes:
   a winding barrel having the wire wound therearound;
   a fixed-side flange placed at one end of the winding barrel; and
   a movable-side flange placed at another end of the winding barrel, and the recess includes a cutout formed in a part of an outer periphery of the winding barrel, a cutout formed in a part of an outer periphery of the fixed-side flange, and a cutout formed in a part of an outer periphery of the movable-side flange, the cutouts being continuous in an axial direction.

2. The coil manufacturing device according to claim 1, wherein the winding barrel is configured to retract into one of the movable-side flange and the fixed-side flange.

3. The coil manufacturing device according to claim 1, wherein the wire bundling device is a taping device for attaching an adhesive tape to the wire, and the taping device includes:

a pair of suction pieces configured to suck ends of a back surface of the adhesive tape having a predetermined length;

a suction piece moving mechanism configured to move the pair of suction pieces to allow the wire suspended in the recess of the winding core to pass between the pair of suction pieces; and an approach mechanism configured to cause the pair of suction pieces to approach each other.

4. The coil manufacturing device according to claim 2, wherein the wire bundling device is a taping device for attaching an adhesive tape to the wire, and the taping device includes:

a pair of suction pieces configured to suck ends of a back surface of the adhesive tape having a predetermined length;

a suction piece moving mechanism configured to move the pair of suction pieces to allow the wire suspended in the recess of the winding core to pass between the pair of suction pieces; and an approach mechanism configured to cause the pair of suction pieces to approach each other.

5. A coil manufacturing device for manufacturing a coil by rotating a winding core and winding a wire around the rotating winding core, the coil manufacturing device comprising:

a recess formed in the winding core, the recess being configured to suspend the wire wound around the winding core in the recess; and a wire bundling device configured to bundle the wire suspended in the recess, wherein the wire bundling device is a taping device for attaching an adhesive tape to the wire, and the taping device includes:

a pair of suction pieces configured to suck ends of a back surface of the adhesive tape having a predetermined length;

a suction piece moving mechanism configured to move the pair of suction pieces to allow the wire suspended in the recess of the winding core to pass between the pair of suction pieces; and an approach mechanism configured to cause the pair of suction pieces to approach each other.

6. The coil manufacturing device according to claim 5, wherein the taping device further includes a tape feeding mechanism configured to feed the adhesive tape of the predetermined length.

7. A coil manufacturing method for manufacturing a coil using a coil manufacturing device for manufacturing the coil by rotating a winding core and winding a wire around the rotating winding core, the coil manufacturing device comprising:

a recess formed in the winding core, the recess being configured to suspend the wire wound around the winding core in the recess; and a wire bundling device configured to bundle the wire suspended in the recess, the coil manufacturing method comprising:

forming the recess in the winding core, the recess configured to suspend the wire wound around the winding core in the recess; and bundling the wire suspended in the recess after winding the wire around the winding core, wherein the bundling the wire is taping whereby an adhesive tape is attached to the wire, and in the taping, the adhesive tape having a predetermined length is attached to the wire suspended in the recess by:

moving a pair of suction pieces sucking ends of a back surface of the adhesive tape of the predetermined length;

allowing the wire suspended in the recess of the winding core to pass between the pair of suction pieces; and then causing the pair of suction pieces to approach each other.

* * * * *